Sept. 27, 1927.

J. P. RATIGAN

LOCK PIN

Filed Dec. 8, 1926

1,643,586

INVENTOR.
JAMES P. RATIGAN.
BY
ATTORNEYS.

Patented Sept. 27, 1927.

1,643,586

UNITED STATES PATENT OFFICE.

JAMES P. RATIGAN, OF WALNUT PARK, CALIFORNIA.

LOCK PIN.

Application filed December 8, 1926. Serial No. 153,444.

This invention relates to lock pins, useful, for example, in detachably connecting two members.

An object of this invention is to facilitate insertion in and removal of the lock pin from bearings provided therefor.

Another object is simplicity and inexpensiveness of construction.

The accompanying drawings illustrate the invention.

Figure 1:
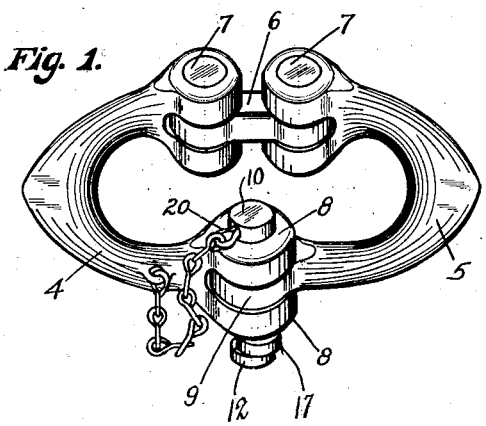
Figure 1 is a perspective view of a connector having embodied therein a lock pin constructed in accordance with the provisions of this invention.

In Fig. 1 is shown a connector of which the present invention is a portion, although it is to be understood that the invention is not limited to use in a connector of the type illustrated but may be used wherever two members are to be detachably connected by a pin. In Fig. 1 are shown end links 4, 5 and an intermediate link 6 pivoted at 7 to the end links. The link 4 is provided at one end with bearings 8 and the link 5 is provided at one end with a bearing 9.

The lock pin of the present invention is indicated, in general, by the character 10 and, when the links 4, 5 are in the closed positions shown in Fig. 1, the lock pin 10 engages the bearings 8, 9.

The lock pin 10 is constructed as follows:
The lock pin comprises a cylindrical body which, in this instance, is formed of two members, a relatively long member 11 and a shorter member 12. The member 11 has at one end a portion 13 of reduced diameter forming a stud which passes through the member 12, being provided with a shoulder 14 against which the member 12 rests so as to space said member 12 from the member 11 and thus form in the body an annular groove 15. The outer end of the stud 13 is headed over, as indicated at 16, to prevent separation of the stud and member 12.

Surrounding the stud 13 is a ring 17, the outside diameter of which is no greater than the diameter of the body. Preferably the outside diameter of the ring is the same as that of the body. The inside diameter of the ring 17 is somewhat greater than the diameter of the stud 13 so as to form a spring chamber 18 which contains a coil spring 19. The coil spring 19 extends transversely of the ring 17 and eccentric of a mid plane of said ring so as to lie on one side of the stud with the ends of the spring substantially in contact with the inner wall of the ring. The expansive force of the spring 19 is exerted to hold the ring in the eccentric position shown in Fig. 2 and shown in solid lines in Fig. 3. This construction is of advantage because of its simplicity, as it makes the assembling operation very easy.

Figure 2:
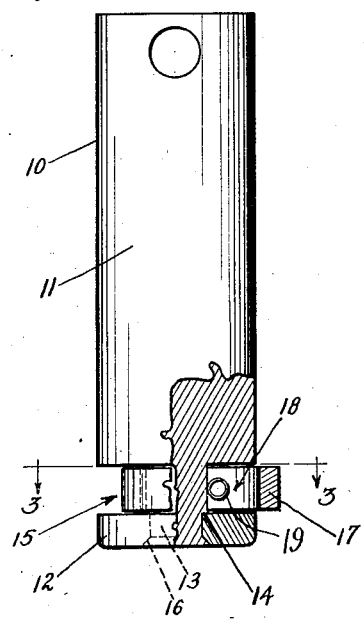
Fig. 2 is an enlarged longitudinal view, partly in section, of the lock pin shown in Fig. 1.
Figure 3:
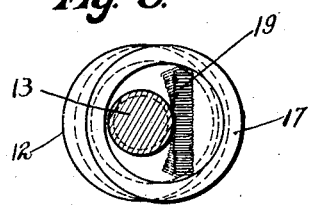
Fig. 3 is a plan view, partly in section, from the line indicated by 3—3 Fig. 2.

By pushing the ring 17, against the expansive force of the spring 19, into concentric position with the stud 13, that portion of the ring that, in Fig. 2, projects outside of the groove 15 may be caused to lie wholly within said groove so that the pin can be slipped through the bearings 8, 9. In the concentric position of the ring 17, the spring 19 is compressed or flexed, as indicated in broken lines in Fig. 3. After the operator forces the ring into concentric position and moves the pin endwise sufficiently to insert the ring in one of the bearings 8, said bearing will maintain the ring in the concentric position while the ring passes from said bearing into the bearing 9, thus making it very easy to insert and withdraw the pin.

The end of the member 11 opposite to the groove 15 may be provided with any suitable stop and, in this instance, said stop is in the form of a cotter pin 20. Thus the cotter pin prevents endwise movement of the pin in one direction and the ring 17 prevents endwise movement of the pin in the opposite direction.

I claim:
A lock pin comprising a body provided with a portion of reduced diameter, a ring surrounding said portion, and a spring inside of the ring having its ends adapted to engage the inner face of the ring, the intermediate portion of the spring engaging the reduced portion.

Signed at Los Angeles, Calif., this 1st day of December, 1926.

JAMES P. RATIGAN.